United States Patent
Fukuta

(10) Patent No.: US 9,623,739 B2
(45) Date of Patent: Apr. 18, 2017

(54) CONSTRUCTION FOR SECURING A TRIM STRIP

(71) Applicant: Nishikawa Rubber Co., Ltd., Hiroshima (JP)

(72) Inventor: Atushi Fukuta, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 0 days.

(21) Appl. No.: 15/169,129

(22) Filed: May 31, 2016

(65) Prior Publication Data

US 2017/0001505 A1     Jan. 5, 2017

(30) Foreign Application Priority Data

Jul. 1, 2015 (JP) ................................ 2015-132942

(51) Int. Cl.

| | |
|---|---|
| *B60J 10/02* | (2006.01) |
| *B60J 10/32* | (2016.01) |
| *B60J 10/74* | (2016.01) |
| *B60J 5/04* | (2006.01) |
| *B60J 10/265* | (2016.01) |

(52) U.S. Cl.
CPC ............ *B60J 10/32* (2016.02); *B60J 5/0402* (2013.01); *B60J 10/265* (2016.02); *B60J 10/74* (2016.02)

(58) Field of Classification Search
CPC . B60J 10/265; B60J 10/88; B60J 10/18; B60J 10/75; B60J 10/32; B60J 10/74; B60J 5/0402; B60R 13/04
USPC .......................................... 49/440, 441, 489.1
See application file for complete search history.

(56) References Cited

U.S. PATENT DOCUMENTS

| | | | | |
|---|---|---|---|---|
| 5,743,047 | A * | 4/1998 | Bonne ...................... | B60J 10/00 49/441 |
| 6,409,251 | B1 * | 6/2002 | Kaye ...................... | B60N 3/026 296/1.02 |
| 6,612,074 | B1 * | 9/2003 | Kaye ...................... | B60J 10/265 296/146.2 |
| 6,679,003 | B2 * | 1/2004 | Nozaki .................. | B60J 5/0402 49/441 |
| 6,742,304 | B1 * | 6/2004 | Mueller ................. | B60J 10/265 49/377 |
| 7,565,771 | B2 * | 7/2009 | Brocke .................... | B60J 10/16 49/377 |
| 8,819,997 | B2 * | 9/2014 | Bouvatier ............... | B60R 13/04 49/440 |
| 9,091,114 | B2 * | 7/2015 | Franzen .................. | F16B 5/121 |
| 9,114,693 | B2 * | 8/2015 | Prater .................. | B60J 10/0091 |

(Continued)

FOREIGN PATENT DOCUMENTS

JP       2012-131304 A       7/2012

*Primary Examiner* — Justin Rephann
(74) *Attorney, Agent, or Firm* — Alston & Bird LLP

(57) ABSTRACT

The present disclosure may reduce the risk of a trim strip coming off a sealing member. A sealing member 30 includes a trim strip securing groove 38 opening toward an outside of a compartment so that a securing leg 47 of a trim strip 45 is inserted into the trim strip securing groove 38. The sealing member 30 is provided with a core 43 including an engagement protruding portion 43*d* protruding toward the inside of the trim strip securing groove 38. Inserted into the trim strip securing groove 38, the securing leg 47 of the trim strip 45 engages with the engagement protruding portion 43*d*.

6 Claims, 8 Drawing Sheets

OUTSIDE OF COMPARTMENT ←       → INSIDE OF COMPARTMENT

(56) References Cited

U.S. PATENT DOCUMENTS

| | | | |
|---|---|---|---|
| 2008/0012242 A1* | 1/2008 | Brocke | B60J 10/16 277/637 |
| 2008/0030046 A1* | 2/2008 | Krause | B60J 10/79 296/146.2 |
| 2009/0151266 A1* | 6/2009 | Shumulinskiy | B60J 10/365 49/489.1 |
| 2009/0183435 A1* | 7/2009 | Daio | B60J 10/74 49/493.1 |
| 2010/0011670 A1* | 1/2010 | O'Sullivan | B60J 10/78 49/489.1 |
| 2013/0074417 A1* | 3/2013 | Kawai | B60J 10/85 49/490.1 |
| 2013/0186018 A1* | 7/2013 | Grandgirard | B60J 1/10 52/204.72 |
| 2014/0007511 A1* | 1/2014 | Franzen | F16B 5/121 49/483.1 |
| 2015/0089878 A1* | 4/2015 | Otsuka | B60J 10/21 49/440 |

* cited by examiner

OUTSIDE OF COMPARTMENT ←

→ INSIDE OF COMPARTMENT

OUTSIDE OF COMPARTMENT ←        → INSIDE OF COMPARTMENT

CONSTRUCTION FOR SECURING A TRIM STRIP

CROSS-REFERENCE TO RELATED APPLICATION

This application claims priority to Japanese Patent Application No. 2015-132942 filed on Jul. 1, 2015, the disclosure of which including the specification, the drawings, and the claims are hereby incorporated by reference in its entirety.

BACKGROUND

The present disclosure relates to a construction for securing a trim strip to a sealing member provided to a window frame for a door of a car and, in particular, belongs to a technical field of a construction which involves securing the trim strip to the sealing member provided from an outside of a compartment of the car to cover an upper frame portion of the window frame.

Doors provided to a side of a car include a door having a window frame holding an edge portion of a window glass, and a door having no window frame; that is, a door having a frameless window. The door having the window frame is provided with a sealing member for sealing a gap between the edge portion of the window frame and an edge portion of an opening portion of the body of the car.

A known example of the construction of the door with this kind of window frame is disclosed in Japanese Unexamined Patent Publication No. 2012-131304. The window frame in the patent publication has an upper frame portion extending along a roof of the body. The upper edge portion is provided with a door flange protruding toward the outside of the compartment. The door flange has a sealing member provided from the outside of the compartment to cover the door flange. Such a construction—the sealing member is provided from the outside of the compartment to cover up the door flange on the upper frame portion—is referred to as a "hidden type".

The sealing member disclosed in the patent publication includes a groove opening toward the outside of the compartment, and continuously formed from a front portion toward a rear portion of the upper frame portion. The groove receives a securing leg of a trim strip so that the trim strip is secured to the sealing member.

SUMMARY

In the hidden-type construction disclosed in the patent publication for securing the sealing member, the upper frame portion of the window frame may be designed to be covered up by the sealing member. Such a construction can be adopted to a car as a matter of design choice, and thus is sufficiently beneficial.

Moreover, as disclosed in the patent publication, an elongated trim strip is secured between the front portion and the rear portion of the upper frame portion in order to improve the appearance of the window frame of the door. Here, a manufacturing challenge is how to secure the trim strip to the hidden-type sealing member.

In the patent publication, the securing leg of the trim strip is inserted into the groove of the sealing member so that the trim strip is secured to the sealing member. However, the securing leg is merely held by making contact with the inner face of the groove. Typically, the sealing member is made of a soft material such as rubber. Hence, even if the sealing member includes a core as disclosed in the patent publication, simply inserting the securing leg of the trim strip into the groove of the sealing member could not effectively prevent the securing leg from coming out of the groove. In particular, if external force is applied to the trim strip to intentionally pull the trim strip out of the groove, the trim strip could come off.

The present disclosure is conceived in view of the above problems to effectively reduce a risk of the trim strip coming off the sealing member.

In the present disclosure, a hidden type sealing member is provided with a trim strip securing groove and a sealing member integrally includes a core provided with an engagement protruding portion protruding toward an inside of the trim strip securing groove, so that a securing leg of a trim strip engages with the engagement protruding portion of the core when inserted into the trim strip securing groove.

A first aspect of the present disclosure is directed to a construction for securing a trim strip. The construction includes: a door flange provided to a window frame of a door of a car, and protruding toward an outside of a compartment of the car; a sealing member provided to the door flange, and covering up the door flange at least from the outside of the compartment; and a trim strip secured to the sealing member, and positioned outside the compartment with respect to the sealing member, wherein the sealing member (i) includes a trim strip securing groove opening toward the outside of the compartment so that a securing leg, formed on the trim strip, is inserted into the trim strip securing groove, and (ii) integrally includes a core for reinforcing the sealing member, the core includes an engagement protruding portion protruding from the core toward an inside of the trim strip securing groove, and when inserted into the trim strip securing groove, the securing leg of the trim strip engages with the engagement protruding portion.

Such features allow the sealing member to cover up the door flange from the outside of the compartment, with the sealing member provided to the door flange of the window frame. Here, the trim strip securing groove of the sealing member is open toward the outside of the compartment. Such an opening allows the securing leg of the trim strip to be easily inserted into the trim strip securing groove from the outside of the compartment. When the securing leg of the trim strip is inserted into the trim strip securing groove, the engagement protruding portion of the core engages with the securing leg. Here, the core, working as a reinforcement of the sealing member, has sufficient stiffness. As a result, the engagement protruding portion successfully reduces the risk that the securing leg comes off.

In a second aspect of the present disclosure according to the first aspect, the securing leg of the trim strip includes a fitting portion fitting, onto the engagement protruding portion, from a tip of the securing leg.

When the securing leg of the trim strip is inserted into the trim strip securing groove, such a feature allows the fitting portion of the securing leg to fit onto the engagement protruding portion of the core. The fitting makes the securing leg, inserted into the trim strip securing groove, even more difficult to come off.

In a third aspect of the present disclosure according to the first aspect, the core includes a plate portion extending along a side face, and in a depth direction, of the trim strip securing groove, and, from the plate portion of the core toward the inside of the trim strip securing groove, the engagement protruding portion is formed to protrude further as protruding deeper into the trim strip securing groove.

Such features sufficiently enhance an effect to reinforce the periphery of the trim strip securing groove in the sealing member, since the plate portion of the core extends along the side face of the trim strip securing groove. Then, from the plate portion, the engagement protruding portion protrudes further as protruding deeper into the trim strip securing groove. Thus, the engagement protruding portion gradually makes harder contact with the securing leg when the securing leg is inserted into the trim strip securing groove. When the securing leg is thoroughly inserted to the engaging position, the engagement protruding portion firmly engages with the securing leg.

In a fourth aspect of the present disclosure according to the first aspect, the engagement protruding portion, protruding toward the inside of the trim strip securing groove, is an upwardly bent portion of the core.

Such a feature allows the engagement protruding portion to be formed on the core when a portion of the core is simply bent. Furthermore, the engagement protruding portion is integrally formed of the core, which provides the engagement protruding portion with sufficient strength.

In a fifth aspect of the present disclosure according to the fourth aspect, the core includes a plate portion extending along a side face, and in a depth direction, of the trim strip securing groove, and the engagement protruding portion is formed in a middle, and in the depth direction, of the trim strip securing groove of the plate portion of the core.

Such features sufficiently enhance an effect to reinforce the periphery of the trim strip securing groove in the sealing member, since the plate portion of the core extends along the side face of the trim strip securing groove. Then, the engagement protruding portion is provided in the middle, and in the depth direction, of the trim strip securing groove of the plate portion.

This allows the securing leg of the trim strip to engage with the engagement protruding portion even if the securing leg is shortened and the trim strip is downsized.

In a sixth aspect of the present disclosure according to the first aspect, the engagement protruding portion of the core is coated with a material made of the sealing member. Such a feature reduces corrosion of the core when the core is coated with the material of the sealing member if the core is made of, for example, a corrosive material.

According to the first aspect of the present disclosure, the hidden type sealing member is provided with the trim strip securing groove and the sealing member integrally includes the core provided with the engagement protruding portion protruding toward the inside of the trim strip securing groove, so that the securing leg of the trim strip engages with the engagement protruding portion of the core when inserted into the trim strip securing groove. Such features may effectively reduce the risk that the trim strip comes off the sealing member.

According to the second aspect of the present disclosure, the fitting portion is provided to the securing leg of the trim strip to fit onto the engagement protruding portion of the core. Such a feature may make the securing leg harder to come off.

According to the third aspect of the present disclosure, the core is formed out of the plate portion extending along the side face, and in the depth direction, of the trim strip securing groove. Such a feature may sufficiently enhance an effect to reinforce the periphery of the trim strip securing groove in the sealing member. Then, the plate portion is provided with the engagement protruding portion, so that the engagement protruding portion protrudes further as protruding deeper into the trim strip securing groove. Such a feature allows the securing leg of the trim strip to reliably engage with the engagement protruding portion without degrading the workability of the securing leg to be inserted to the engaging position.

According to the fourth aspect of the present disclosure, the engagement protruding portion is simply formed when a portion of the core is bent. Furthermore, the engagement protruding portion is formed integrally with the core. Such a feature provides the engagement protruding portion with sufficient strength, which makes the securing leg even more difficult to come off.

According to the fifth aspect of the present disclosure, the core is formed out of the plate portion extending along the side face, and in the depth direction, of the trim strip securing groove, and the engagement protruding portion is formed in the middle of the plate portion. Such features allow the securing leg of the trim strip to engage with the engagement protruding portion even if the securing leg is shortened and the trim strip is downsized.

According to the sixth aspect of the present disclosure, the engagement protruding portion of the core is coated with the material of the sealing member. Such a feature successfully reduces corrosion of the core.

DETAILED DESCRIPTION

Embodiments of the present disclosure will be described in detail below, with reference to the drawings. Note that the preferable embodiments below are essentially mere examples, and are not intended to limit the scopes of the present disclosure, of the application of the present disclosure, or of the use of the present disclosure.

(Configuration of Door)

Figure 1:
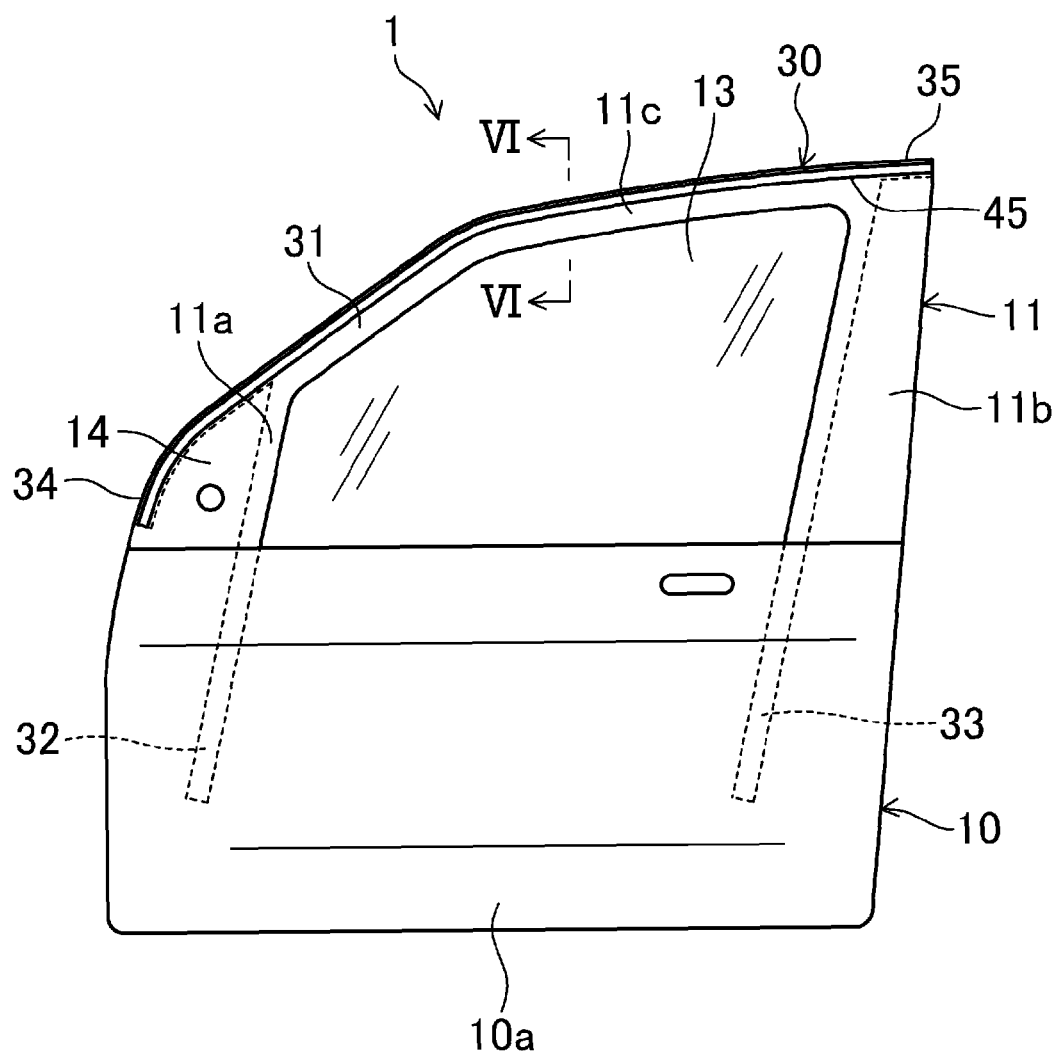
FIG. 1 is a side view of a front door, for a car, having a construction for securing a trim strip according to embodiments.
Figure 2:
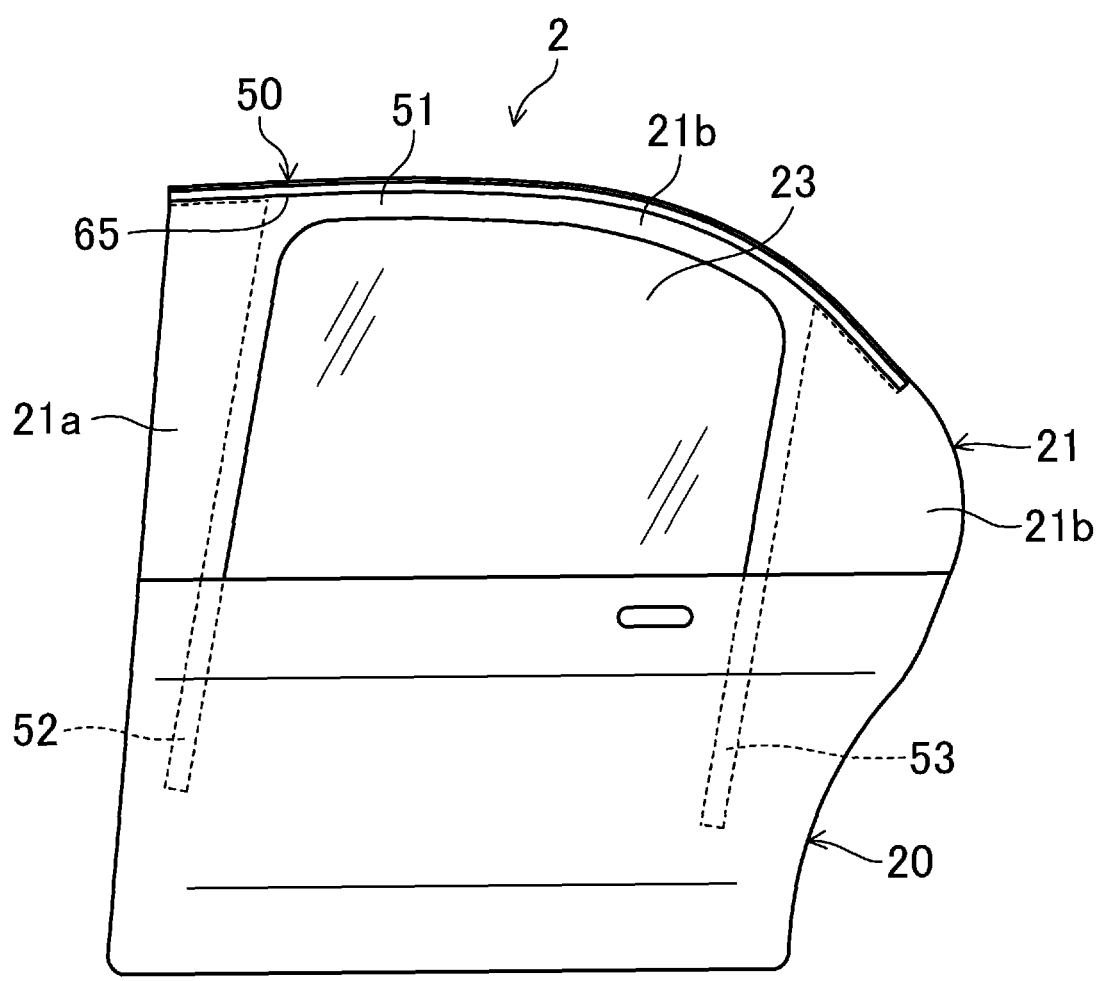
FIG. 2 is a side view of a rear door, for the car, having the construction for securing a trim strip according to the embodiments.

FIG. 1 is a side view of a front door 1, for a car, having a construction for securing a trim strip according to embodiments of the present disclosure. Here, the front door 1 is observed from the outside of a compartment of the car. FIG. 2 is a side view of a rear door 2, for the car, having the construction for securing a trim strip according to the embodiments of the present disclosure. Here, the rear door 2 is observed from the outside of the compartment. The front door 1 and the rear door 2 are arranged to a side of the car (not shown). The front door 1 opens and closes an opening portion (not shown) defined in the front, and to the side, of the car. The rear door 2 opens and closes an opening portion (not shown) defined in the rear, and to the side, of the car.

The front door 1 includes a door body 10 to be an approximately lower half of the front door 1, and a window frame 11 to be an approximately upper half of the front door 1. Even though not shown, a front end portion of the door body 10 is secured to a pillar of the car body via a hinge having a vertically extending rotational pin. The door body 10 includes an inner panel (not shown) and an outer panel 10a made of, for example, a steel plate. The door body 10 houses a window glass 13 which rises and falls, and a window regulator (not shown) to raise and lower the window glass 13.

Figure 7:
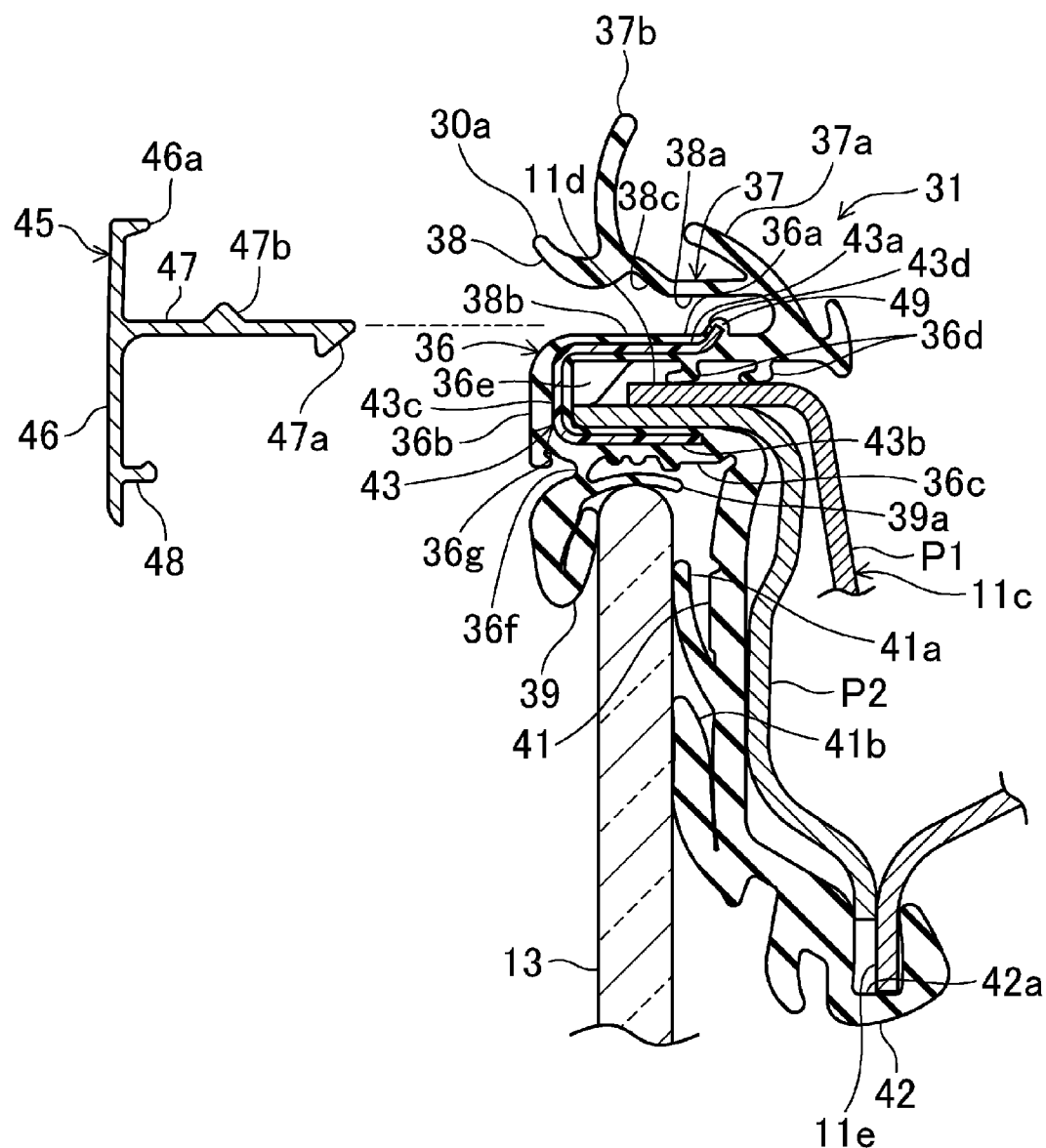
FIG. 7 is an illustration in FIG. 6 before the trim strip is secured.

The window frame 11 functions as a sash to hold an edge portion of the window glass 13. As illustrated in FIG. 7, the window frame 11 according to these embodiments is a combination of a first panel member P1 and a second panel member P2 made of, for example, a pressed metal plate. However, the window frame 11 may be made by roll forming, for example.

As illustrated in FIG. 1, the window frame 11 includes a front longitudinal frame edge portion 11a, a rear longitudinal frame edge portion 11b, and a upper frame edge portion 11c. The front longitudinal frame edge portion 11a extends upward from an upper front edge of the door body 10. The rear longitudinal frame edge portion 11b extends upward from an upper rear edge of the door body 10. The rear longitudinal frame edge portion 11b extends above the front longitudinal frame edge portion 11a. The upper frame edge portion 11c extends between a top end of the front longitudinal frame edge portion 11a and a top end of the rear longitudinal frame edge portion 11b, in the front-rear direction along an edge portion (not shown) of a roof of the body.

In front of the front longitudinal frame edge portion 11a of the window frame 11, a door mirror securing portion 14 is provided to extend upward the door body 10. A not-shown door mirror is secured to the door mirror securing portion 14. An upper edge portion of the door mirror securing portion 14 is formed to lead to a front end portion of the upper frame edge portion 11c of the window frame 11. The upper end portion slopes downward as extending toward the front.

Figure 5:
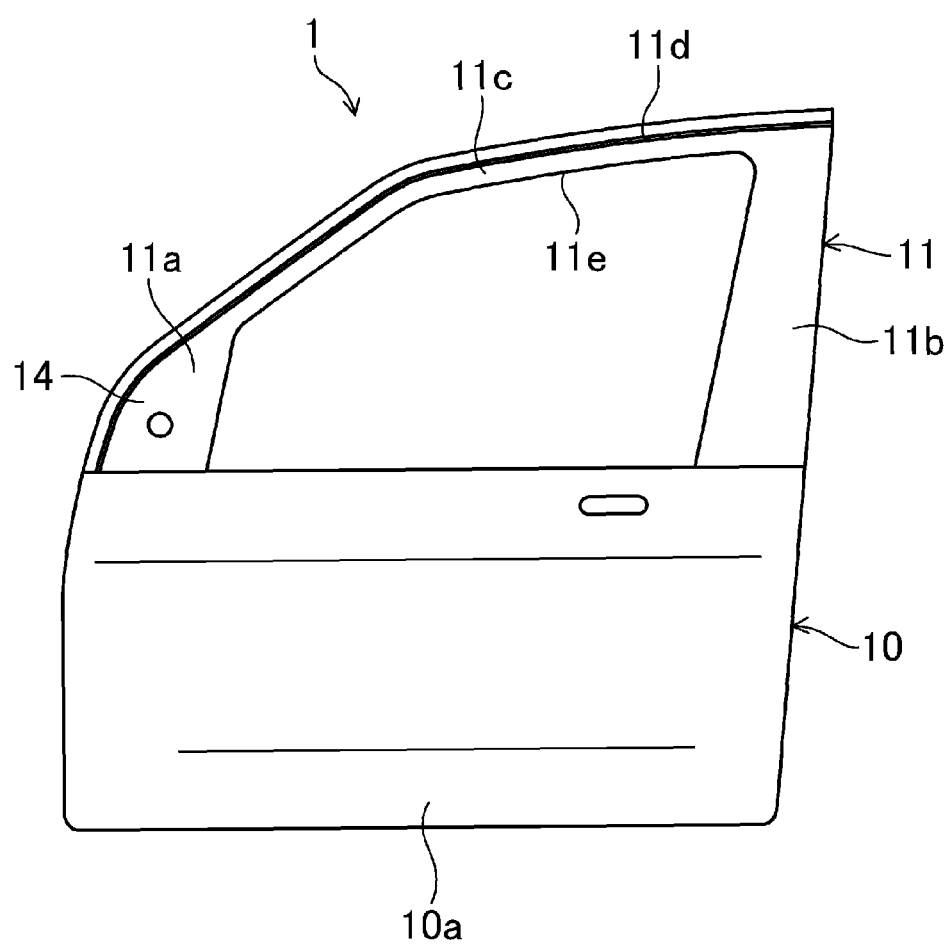
FIG. 5 is a side view of the front door with the sealing member and the trim strip removed.

As illustrated in FIG. 7, a door flange 11d is provided to the upper frame edge portion 11c of the window frame 11, and protruding toward the outside of the compartment. Edge portions of the first panel member P1 and the second panel member P2, included in the window frame 11, are shaped to extend toward the outside of the compartment, and vertically overlap with each other to form the door flange 11d. In the door flange 11d, the edge portion of the first panel member P1 is positioned above the edge portion of the second panel member P2. Moreover, the edge portion of the first panel member P1 is positioned slightly more inwardly toward the compartment than the edge portion of the second panel member P2. However, the positioning of the edges shall not be limited to this. As illustrated in FIG. 5, the front portion of the door flange 11d continuously extends to the front portion of the door mirror securing portion 14.

Furthermore, as illustrated in FIG. 7, a sealing member fitting plate portion 11e is provided below the upper frame edge portion 11c to extend downward. Edge portions of the first panel member P1 and the second panel member P2, included in the window frame 11, are shaped to extend downward and overlap with each other in the inside-outside direction of the compartment to form the sealing member fitting plate portion 11e.

As illustrated in FIG. 5, the upper frame edge portion 11c is bent in the middle in the front-rear direction when seen from the side. Then, in the upper frame edge portion 11c, a portion before the bent portion slopes downward and extends toward the front. Moreover, in the upper frame edge portion 11c, a portion behind the bent portion slopes at a more obtuse angle than the sloping angle of the front portion and extends toward the bent portion. Note that the shape of the upper frame edge portion 11c shall not be limited to that illustrated in FIG. 5. The upper frame edge portion 11c may bend round upward overall. The position of the bent portion and the sloping angle of the upper frame edge portion 11c may be set in any given manner to conform to the shape of the roof of the body.

As illustrated in FIG. 1, the door flange 11d is provided with a sealing member 30. Furthermore, a trim strip 45 is secured to the sealing member 30 to be positioned outside the compartment with respect to the sealing member 30.

Figure 4:
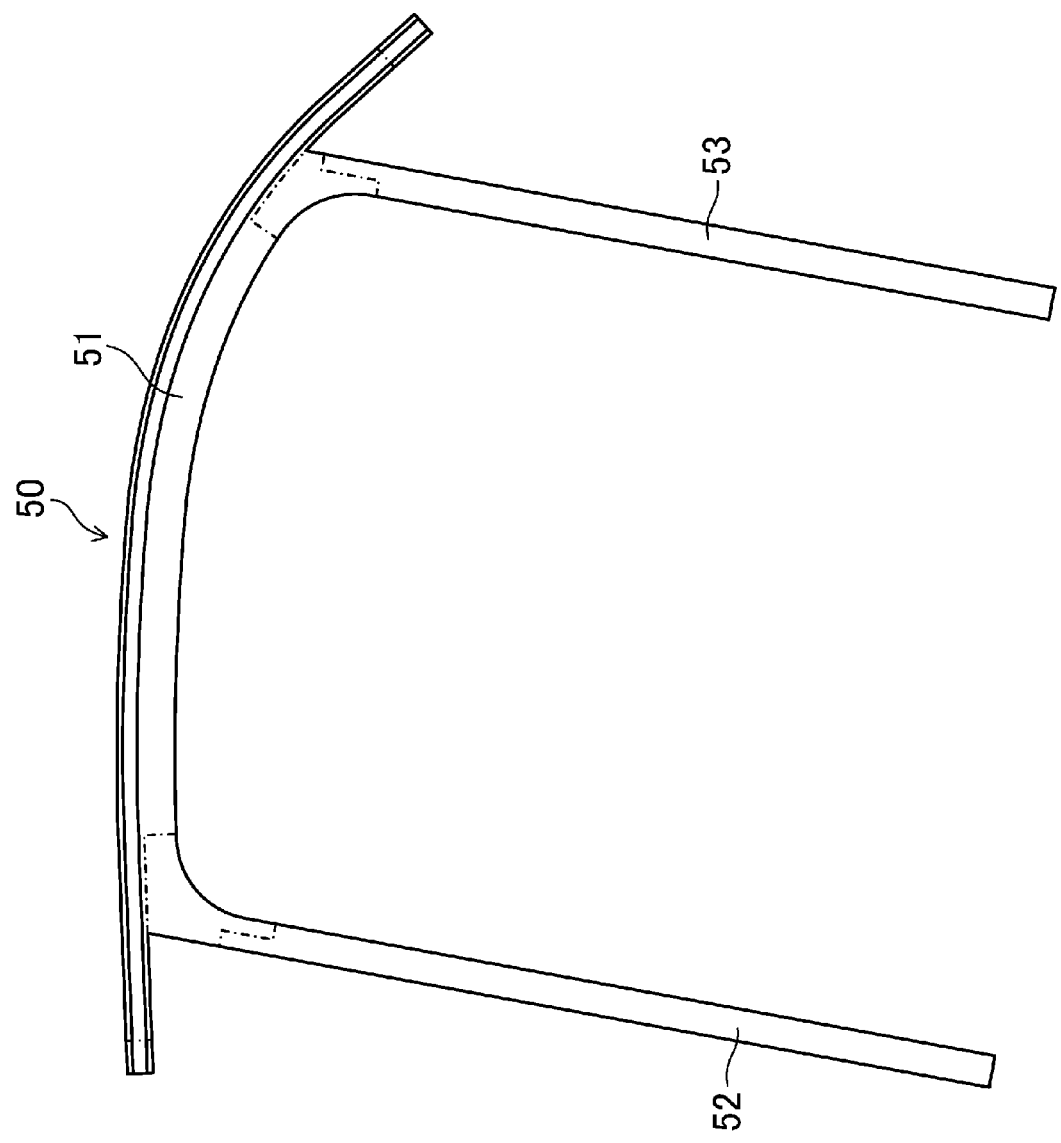
FIG. 4 is a side view of a sealing member provided to the rear door.

Basically, the rear door 2 illustrated in FIG. 2 is the same in construction as the front door 1. Specifically, the rear door 2 includes a door body 20, and a window frame 21 holding an edge portion of a window glass 23. The window frame 21 includes a front longitudinal edge portion 21a, a rear longitudinal edge portion 21b, and an upper edge portion 21c. Then, as illustrated in FIG. 4, the rear door 2 is provided with a sealing member 50. The numerical reference 65 in FIG. 2 denotes a trim strip.

(Configuration of Sealing Member)

The sealing member 30, which is referred to as a "hidden type", is provided from the outside of the compartment to cover up the door flange 11d. Concurrently, the sealing member 30 is formed to cover up a top face and a bottom face of the door flange 11d. The sealing member 30 seals a gap between the edge portion of the window frame 11 and the edge portion of the opening portion of the body. The sealing member 30 also seals a gap between the edge portion of the window frame 11 and the edge portion of the window glass 13. The sealing member 30 is made of an elastic and waterproof material such as ethylene-propylene-diene rubber (EPDM) and thermoplastic elastomer olefin (TPO).

Figure 3:
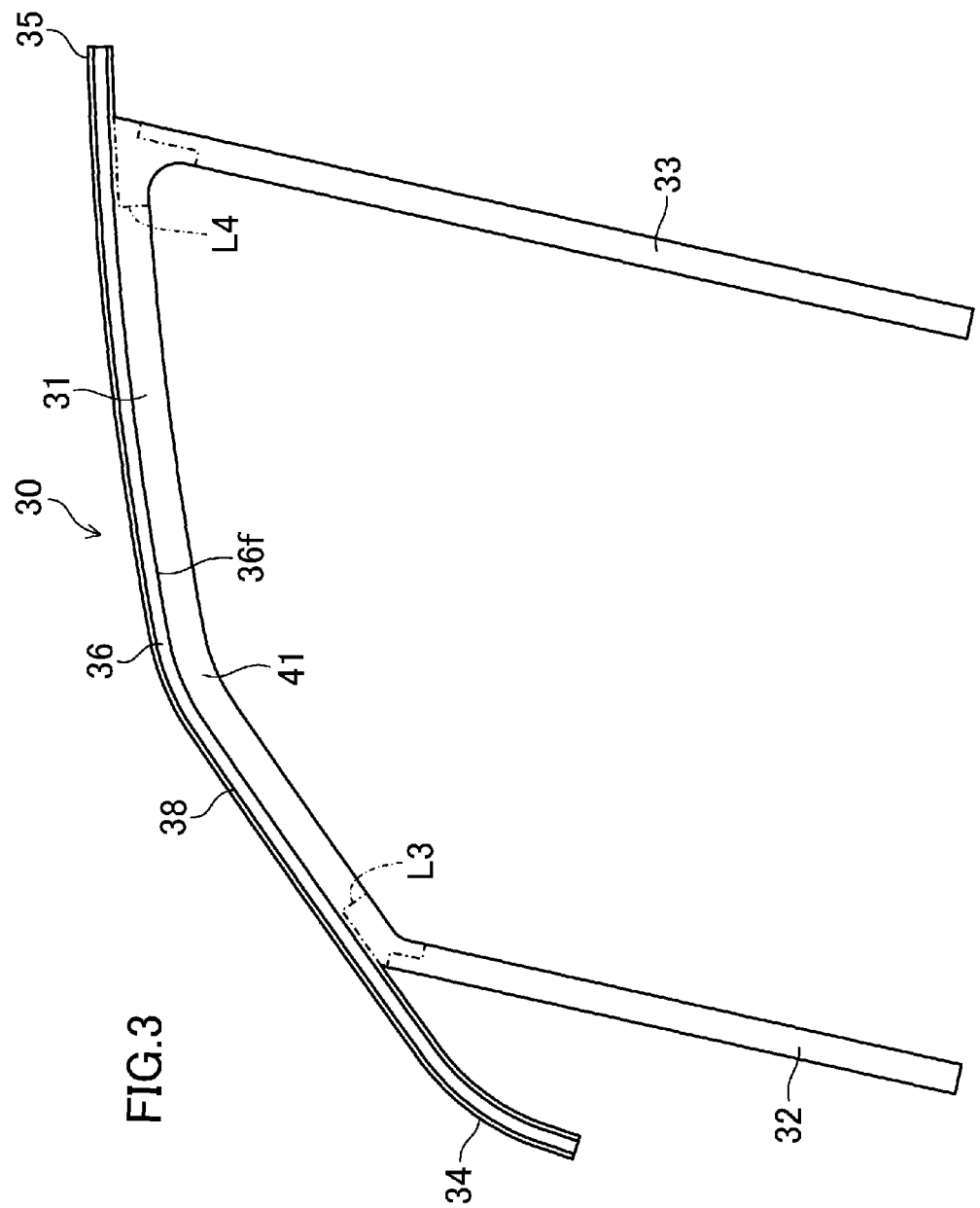
FIG. 3 is a side view of a sealing member provided to the front door.

The sealing member 30 includes: an upper seal edge portion 31 extending along the upper frame edge portion 11c of the window frame 11; a front longitudinal seal edge portion 32 extending along the front longitudinal frame edge portion 11a of the window frame 11; and a rear longitudinal seal edge portion 33 extending along the rear longitudinal frame edge portion 11b of the window frame 11. As illustrated in FIG. 3, the upper seal edge portion 31, the front longitudinal seal edge portion 32, and the rear longitudinal seal edge portion 33 are integrated into one.

Lower portions of the front longitudinal seal edge portion 32 and the rear longitudinal seal edge portion 33 extend into the door body 10 to be positioned near a lower portion of the door body 10 and held by a holding member (not shown) provided inside the door body 10.

The front longitudinal seal edge portion 32 and the rear longitudinal seal edge portion 33 extend in the moving direction of the respective front edge portion and rear edge portion of the window glass 13 in rising and falling, so that the front edge portion and the rear edge portion of the window glass 13 are slidably in contact with the front longitudinal seal edge portion 32 and the rear longitudinal seal edge portion 33.

As illustrated in FIG. 3, a front seal portion 34 is continuously provided to the front portion of the upper seal edge portion 31 to extend before the front longitudinal seal edge portion 32. As illustrated FIG. 1, the front seal portion 34 is formed to extend along the upper edge portion of the door mirror securing portion 14. Furthermore, as illustrated in FIG. 3, a rear seal portion 35 is continuously provided to the rear portion of the upper seal edge portion 31 to extend behind the rear longitudinal seal edge portion 33.

The sealing member 30 is a combination of an extrusion-molded portion made by extrusion molding and a die-formed portion made by die forming. As illustrated in FIG. 3, there is a die-formed portion surrounded by a boundary L3 defined by a dashed-dotted line on the border between the upper seal edge portion 31 and the front longitudinal seal edge portion 32 of the sealing member 30. Furthermore, there is another die-formed portion surrounded by a boundary L4 defined by a dashed-dotted line on the border between the upper seal edge portion 31 and the rear longitudinal seal edge portion 33 of the sealing member 30. The extrusion-molded portion is other than the above two die-formed portions.

Figure 6:
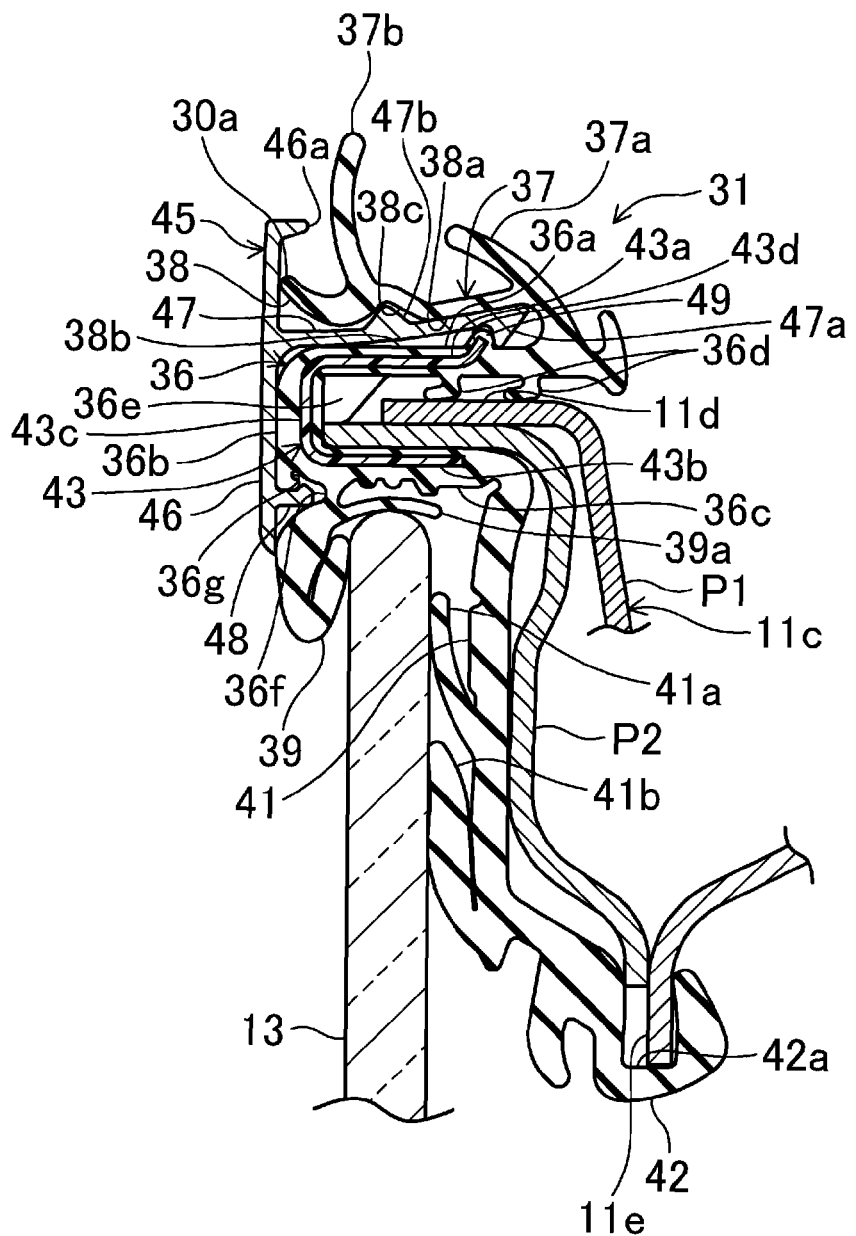
FIG. 6 is a cross-sectional view taken from line VI-VI of FIG. 1.

The upper seal edge portion 31 of the sealing member 30 has a cross-sectional shape as illustrated in FIG. 6. The cross-sectional shape is approximately the same the front end portion through the rear end portion of the upper seal edge portion 31; whereas, cross-sectional shapes of the front seal portion 34 and the rear seal portion 35 are different from the cross-sectional shape of the upper seal edge portion 31.

Specifically, as illustrated in FIG. 7, the upper seal edge portion 31 includes a door flange fitting portion 36 forming an upper portion of the seal upper edge portion 31, and fitting onto the door flange 11d, and a plate portion 41 extending downward from the door flange fitting portion 36. The door flange fitting portion 36 includes: a top plate portion 36a extending, along the top face of the door flange 11d, in the inside-outside direction of the compartment; a longitudinal plate portion 36b extending downward from an end portion, of the top plate portion 36a, close to the outside of the compartment; and a bottom plate portion 36c extending, along the bottom face of the door flange 11d, toward the inside of the compartment. These portions 36a, 36b and 36c form an approximately U-shaped cross-section opening toward the inside of the compartment. The door flange 11d is inserted into the opening, of the door flange fitting portion 36, toward the inside of the compartment. As a result, the door flange fitting portion 36 is secured by fitting onto the door flange 11d. In the secured state, the top plate portion 36a, the longitudinal plate portion 36b, and the bottom plate portion 36c of the door flange fitting portion 36 respectively cover up the top face, an outer end portion, and the bottom face of the door flange 11d.

On a bottom face of the top plate portion 36a in the door flange fitting portion 36, two projecting portions 36d, extending in a longitudinal direction of the upper seal edge portion 31, are formed at an interval in the inside-outside direction of the compartment. The projecting portions 36d are flexible, and flex in contact with the door flange 11d while the door flange fitting portion 36 fits onto the door flange 11d.

The longitudinal plate portion 36b in the door flange fitting portion 36 has an interior face provided with a sealant 36e. This sealant 36e is displaced upward, and positioned across from an end portion of the first panel member P1. The second panel member P2 has an end portion fit between the sealant 36e and an interior face of the bottom plate portion 36c in the door flange fitting portion 36.

The top plate portion 36a in the door flange fitting portion 36 has an end portion, to the inside of the compartment, provided with an outer plate portion 37 folded toward and extending to the outside of the compartment. The outer plate portion 37 is separately formed upward away from the top face of the top plate portion 36a in the door flange fitting portion 36. Between the interior surface of the outer plate portion 37 and the top face of the top plate portion 36a, a trim strip securing groove 38 is formed to open toward the outside of the compartment so that a securing leg 47, formed on the trim strip 45 as described later, is inserted into the trim strip securing groove 38.

Of side faces 38a and 38b of the trim strip securing groove 38, the side face 38a positioned above has a recessed portion 38c formed in the middle of the trim strip securing groove 38 along its depth (in the inside-outside direction of the compartment).

The outer plate portion 37 has, on its end portion, an inner lip portion 37a protruding upward provided at the inside of the compartment. This inner lip portion 37a is formed to bend round so that a higher portion of the inner lip portion 37a is closer to the outside of the compartment. Moreover, the outer plate portion 37 is provided with an outer lip portion 37b positioned outside the compartment and protruding upward. This outer lip portion 37b extends upward above the inner lip portion 37a. When the front door 1 is closed, the inner lip portion 37a and the outer lip portion 37b provide a seal by making contact with the edge portion of the opening portion of the body.

On a lower portion of an exterior face of the door flange fitting portion 36, a claw-receiving recessed portion 36f is formed to receive a securing claw 48, which is described later, of the trim strip 45. The claw-receiving recessed portion 36f has an interior surface provided with a hook portion 36g protruding toward the inside of the claw-receiving recessed portion 36f. The securing claw 48 of the trim strip 45 is hooked over the hook portion 36g.

On a lower portion of the door flange fitting portion 36, a glass contacting portion 39 is provided to extend downward. After extending downward, the glass contacting portion 39 is folded toward the inside of the compartment, and formed to have an approximate V-shaped cross section. When a tip of the glass contacting portion 39 makes contact with the edge portion of the window glass 13, a sealing effect is provided. Moreover, the glass contacting portion 39 has a base end portion provided with an extending plate portion 39a extending toward the inside of the compartment. This extending plate portion 39a also makes contact with the edge portion of the window glass 13.

In these embodiments, the plate portion 41 in a lower portion of the upper seal edge portion 31 is formed into, but not limited to, a single piece with the door flange fitting portion 36 in an upper portion of the upper seal edge portion 31. The door flange fitting portion 36 and the plate portion 41 may also be separately formed from each other.

The plate portion 41 is formed to cover, from the outside of the compartment, a portion of the upper frame edge portion 11c below the door flange 11d. The plate portion 41 has a face, to the outside of the compartment, provided with (i) an upper lip portion 41a formed in the vertical middle of the face and (ii) a lower lip portion 41b formed on a lower portion of the face. When the upper lip portion 41a and the lower lip portion 41b make contact with the edge portion of the window glass 13, a sealing effect is provided.

On a lower portion of the plate portion 41, a protruding portion 42 is provided to extend downward. The protruding portion 42 has a fitting groove 42a formed to open upward. The sealing member fitting plate portion 11e fits in the fitting groove 42a.

Meanwhile, as illustrated in FIG. 3, the front seal portion 34 and the rear seal portion 35 are not provided with the plate portion 41. Accordingly, the front seal portion 34 and the rear seal portion 35 are narrower in width than the upper seal edge portion 31.

Furthermore, as illustrated in FIG. 4, the sealing member 50 of the rear door 2 is similar in structure to the sealing member 30 of the front door 1, and includes a upper seal edge portion 51, a front longitudinal seal edge portion 52, and a rear longitudinal seal edge portion 53.

(Configuration of Core)

As illustrated in FIG. 7, the sealing member 30 configured above integrally includes a core 43 for reinforcing the sealing member 30. The core 43 and the sealing member 30 are bonded together. Similar to the cross-sectional shape of the door flange fitting portion 36 in the sealing member 30, the core 43 has an approximate U-shaped cross-section opening toward the inside of the compartment. Specifically, the core 43 includes a first plate portion 43a, a second plate portion 43b, and a connecting plate portion 43c all of which are formed into a single piece. The first plate portion 43a extends, along the side face 38a in the upper portion of the trim strip securing groove 38, in the depth direction of the trim strip securing groove 38. The second plate portion 43b extends, along the side face 38b in the lower portion of the trim strip securing groove 38, in the depth direction of the trim strip securing groove 38. The connecting plate portion 43c vertically extends to connect ends, of the first plate portion 43a and the second plate portion 43b, facing the outside of the compartment. The core 43 may be made of any given material as long as the material successfully reinforces the sealing member 30. The material may include, but not specifically limited to, an aluminum alloy, stainless steel, and hard resin such as resin in which talc and glass fibers are blended together.

The core 43 has the first plate portion 43a embedded in the top plate portion 36a of the door flange fitting portion 36 included in the sealing member 30, the second plate portion 43b embedded in the bottom plate portion 36c of the door flange fitting portion 36, and the connecting plate portion 43c embedded in the longitudinal plate portion 36b of the door flange fitting portion 36. Such features allow the core 43 to reinforce the approximately entire door flange fitting portion 36 in the sealing member 30 such that the sealing member 30 firmly fit onto the door flange 11d.

The first plate portion 43a of the core 43 includes an engagement protruding portion 43d protruding from the first plate portion 43a toward the inside of the trim strip securing groove 38. Formed integrally with the core 43, the engagement protruding portion 43d is an upwardly bent end portion, of the first plate portion 43a, close to the inside of the compartment. The core 43 may also be made of a metal plate. In such a case, the engagement protruding portion 43d is formed with the metal plate cut and stood.

In these embodiments, a protruding tip portion of the engagement protruding portion 43d protrudes from the side face 38a in the upper portion of the trim strip securing groove 38, into the trim strip securing groove 38. If the core 43 is made of metal, which is susceptible to corrosion, the engagement protruding portion 43d is beneficially coated with a coating portion 49 formed of a material of the sealing member 30. If the core 43 is resistant to corrosion, the coating portion 49 may be omitted, and the engagement protruding portion 43d may be exposed.

Moreover, the engagement protruding portion 43d is formed to protrude further from the first plate portion 43a as protruding deeper into the trim strip securing groove 38. Such a feature allows the exterior face of the engagement protruding portion 43d to slant with respect to the first plate portion 43a. Note that the shape of the engagement protruding portion 43d shall not be limited to this. For example, the engagement protruding portion 43d may have a semi-circled or rectangular cross-section.

Furthermore, even though not shown, the first plate portion 43a, the second plate portion 43b, and the connecting plate portion 43c of the core 43 may have multiple slits formed at intervals in the longitudinal direction of the core 43 so that the core 43 may be flexible.

(Configuration of Trim Strip)

The trim strip 45 is secured so as to face the outside of the compartment with respect to the sealing member 30. The trim strip 45 is made of, for example, an aluminum alloy to give a metallic touch to the front door 1. Note that the trim strip 45 may also be made of resin. In such a case, a portion of the trim strip 45 facing the outside of the compartment may be plated or provided with a metallic plate so that the trim strip 45 looks metallic.

As illustrated in FIG. 1, the trim strip 45 is an elongated member extending the front end portion of the front seal portion 34 through the rear end portion of the rear seal portion 35 in the sealing member 30. As illustrated in FIGS. 6 and 7, the trim strip 45 includes: a body plate portion 46 extending along the exterior face of the door flange fitting portion 36; the securing leg 47 protruding toward the inside of the compartment from an upper portion on an interior face, of the body plate portion 46, close to the compartment; and the securing claw 48 protruding toward the inside of the compartment from a lower portion of the interior face, of the body plate portion 46, close to the compartment. The body plate portion 46 has an upper edge portion provided with a bent portion 46a bent toward the inside of the compartment. This bent portion 46a has an interior surface making contact with an upper edge portion 30a of the sealing member 30.

The securing leg 47 is a portion to be inserted into the trim strip securing groove 38 of the sealing member 30, and formed to extend and arrive close to a bottom portion of the trim strip securing groove 38 when inserted. Inserted into the trim strip securing groove 38, the securing leg 47 makes contact and engages with the engagement protruding portion 43d of the core 43, from the protruding direction of the engagement protruding portion 43d. Here, the engagement protruding portion 43d may be wedged into the securing leg 47 so that the securing leg 47 engages with the engagement protruding portion 43d.

Moreover, the securing leg 47 has a protruding tip portion (an inserting tip portion), provided with a fitting portion 47a fitting, onto the engagement protruding portion 43d of the core 43, from the tip of the securing leg 47. The fitting portion 47a includes a protruding portion protruding downward from a bottom face of the securing leg 47. This fitting portion 47a hooks over the engagement protruding portion 43d of the core 43 from the protruding tip, and engages with the engagement protruding portion 43d.

The securing leg 47 has a top face provided with a middle protruding portion 47b in the middle of the top face in the inserting direction. Protruding opposite to the protrusion of the fitting portion 47a, the middle protruding portion 47b is inserted and fits into the recessed portion 38c formed on the side face 38a of the trim strip securing groove 38.

The securing claw 48 of the trim strip 45 is inserted into the claw-receiving recessed portion 36f formed on the exterior face of the sealing member 30. Inserted into the claw-receiving recessed portion 36f, the securing claw 48 hooks over the hook portion 36g.

As illustrated in FIG. 2, a trim strip 65 of the rear door 2 is similar in configuration to the trim strip 45 of the front door 1, and secured to the rear door 2. The trim strip 65 of the rear door 2 and the trim strip 45 of the front door 1 are continuously arranged with each other when seen from the side.

(How to secure Sealing Member and Trim Strip)

Described next is how to secure the sealing member 30 and the trim strip 45. Described first is how to secure the sealing member 30. In securing the sealing member 30 to the window frame 11, the sealing member 30 is placed outside the compartment with respect to the window frame 11. The opening portion of the door flange fitting portion 36 in the sealing member 30 is positioned opposite a tip portion of the door flange 11d in the window frame 11. After that, the tip portion of the door flange 11d is inserted into the door flange fitting portion 36 of the sealing member 30. In a similar manner, the front seal portion 34 of the sealing member 30 is secured to the door mirror securing portion 14, and the rear seal portion 35 is secured to an upper end portion of the rear longitudinal frame edge portion 11b. Lower portions of the front longitudinal seal edge portion 32 and the rear longitudinal seal edge portion 33 may be inserted in advance into the door body 10.

Moreover, the sealing member fitting plate portion 11e of the upper frame edge portion 11c is fitted into the fitting groove 42a provided to a lower portion of the sealing member 30, so that the plate portion 41 of the sealing member 30 is fixed to the window frame 11.

As can be seen, the sealing member 30 is secured to the window frame 11. After that, the trim strip 45 is secured to the sealing member 30. Specifically, a tip of the securing leg 47 in the trim strip 45 is positioned opposite the opening portion of the trim strip securing groove 38 in the sealing member 30. Concurrently, a tip of the securing claw 48 in the trim strip 45 is positioned opposite the opening portion of the claw-receiving recessed portion 36f in the sealing member 30. After that, the trim strip 45 is moved closer to the sealing member 30, and the securing leg 47 of the trim strip 45 is inserted into the trim strip securing groove 38 in the sealing member 30. Concurrently, the securing claw 48 of the trim strip 45 is inserted into the claw-receiving recessed portion 36f of the sealing member 30. When the securing claw 48 of the trim strip 45 is inserted into the claw-receiving recessed portion 36f of the sealing member 30, the securing claw 48 hooks over the hook portion 36g. This makes the securing claw 48 difficult to come off.

Moreover, when the securing leg 47 of the trim strip 45 is inserted into the trim strip securing groove 38 of the sealing member 30, the tip of the securing leg 47 is slidably in contact with the engagement protruding portion 43d because the engagement protruding portion 43d protrudes into the trim strip securing groove 38. Here, the engagement protruding portion 43d is formed to protrude further as protruding deeper into the trim strip securing groove 38. Thus, the engagement protruding portion 43d gradually makes tighter contact with the securing leg 47. When the securing leg 47 is thoroughly inserted into the engaging position, the engagement protruding portion 43d reliably engages with the securing leg 47. Then, the fitting portion 47a of the securing leg 47 fits onto the engagement protruding portion 43d. Concurrently, the middle protruding portion 47b of the securing leg 47 fits into the recessed portion 38c of the trim strip securing groove 38.

(Effects of Embodiments)

As can be seen, the construction for securing the trim strip 45 according to these embodiments allows the sealing member 30 to cover up the door flange 11d from the outside of the compartment with the sealing member 30 secured to the door flange 11d of the window frame 11. Such a feature allows the construction to be designed as the "hidden type".

Then, the trim strip securing groove 38 of the sealing member 30 is open to the outside of the compartment. Such a feature allows the securing leg 47 of the trim strip 45 to be easily inserted into the trim strip securing groove 38 from the outside of the compartment. When the securing leg 47 of the trim strip 45 is inserted into the trim strip securing groove 38, the engagement protruding portion 43d of the core 43, protruding into the trim strip securing groove 38, engages with the securing leg 47. Here, the core 43 works to reinforce the sealing member 30, and has sufficient stiffness because the core 43 is harder than the material of the sealing member 30. Hence, even if external force is applied to the trim strip 45 to pull the trim strip 45 out of the trim strip securing groove 38, the engagement protruding portion 43d successfully reduces the risk that the securing leg 47 of the trim strip 45 comes off.

Furthermore, the fitting portion 47a is provided to the securing leg 47 of the trim strip 45 to fit onto the engagement protruding portion 43d of the core 43. Such a feature may make the securing leg 47 more difficult to come off.

Moreover, the core 43 is formed out of the first plate portion 43a extending along the side face 38a, and in the depth direction, of the trim strip securing groove 38. Such a feature may sufficiently enhance an effect to reinforce the periphery of the trim strip securing groove 38 in the sealing member 30. Then, the first plate portion 43a is provided with the engagement protruding portion 43d, so that the engagement protruding portion 43d protrudes further as protruding deeper into the trim strip securing groove 38. Such a feature allows the securing leg 47 of the trim strip 45 to reliably engage with the engagement protruding portion 43d without degrading the workability of the securing leg 47 to be inserted to the engaging position.

Furthermore, the engagement protruding portion 43d is formed integrally with the core 43 that is hard. Such a feature provides the engagement protruding portion 43d with sufficient strength, which makes the securing leg 47 even more difficult to come off (Other Embodiments)

Figure 8:
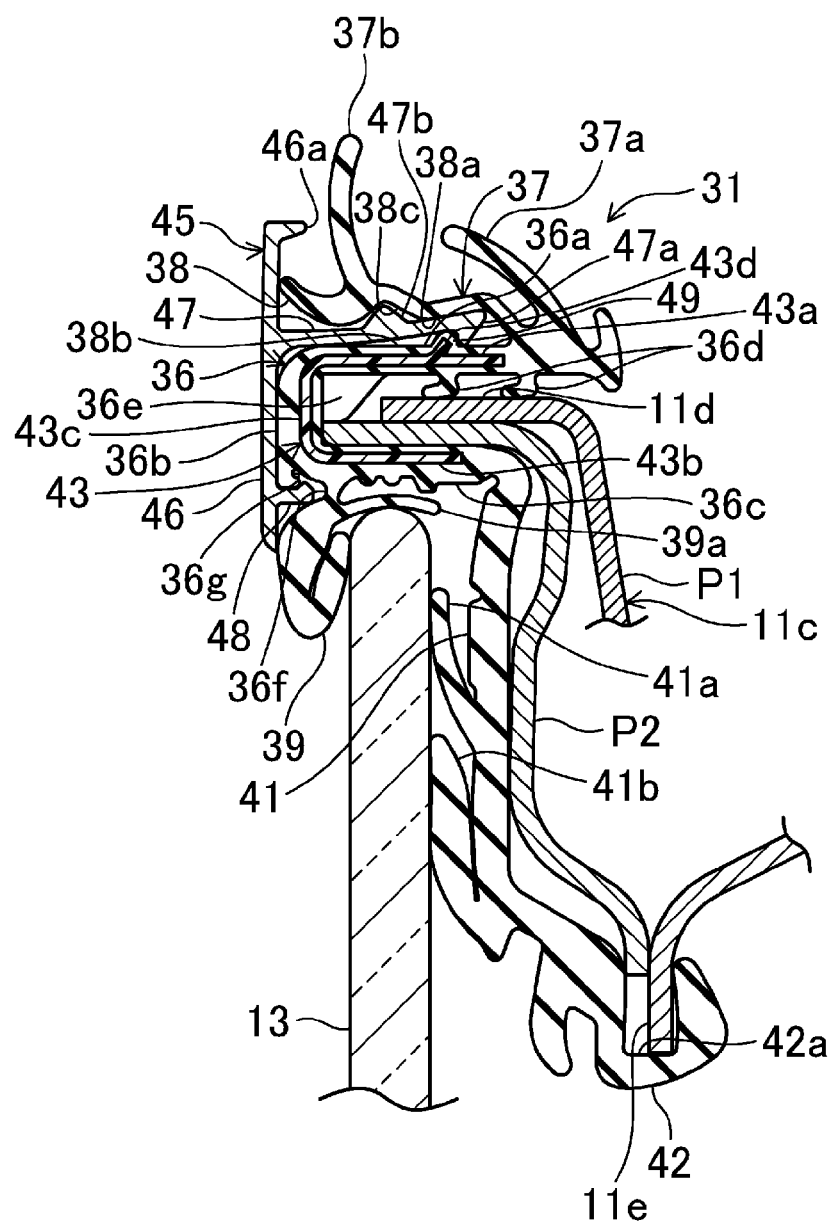
FIG. 8 is an illustration in FIG. 6 according a modified example of the embodiments.

As illustrated in a modified example in FIG. 8, the engagement protruding portion 43d may be formed in the middle, and in the depth direction, of the trim strip securing groove 38 for the first plate portion 43a of the core 43. In this modified example, the engagement protruding portion 43d is positioned close to the outside of the compartment. Such a feature allows the securing leg 47 to engage with the engagement protruding portion 43d even if the securing leg 47 of the trim strip 45 is shortened and the trim strip 45 is downsized.

Moreover, in the embodiments, only one engagement protruding portion 43d is provided to the core 43. However, the number of the engagement protruding portions 43d shall not be limited to one. Two or more engagement protruding portions 43d may be provided. Furthermore, the engagement protruding portion 43d may also be provided to the second plate portion 43b. Moreover, respective engagement protruding portions 43d may be provided to both the first plate portion 43a and the second plate portion 43b. The fitting portion 47a of the trim strip 45 may be changed in accordance with the shape of the engagement protruding portion 43d.

The above embodiments are mere examples in all respects, and shall not be limited in interpretation. In addition, all the changes, including the shape, to the equivalents in the claims shall be within the scope of the present disclosure.

As can be seen, a construction for securing a trim strip according to the present disclosure may be applicable when the trim strip is secured through a sealing member to a window frame of a door of a car.

What is claimed is:

1. A construction for securing a trim strip, the construction comprising:
   a door flange provided to a window frame of a door of a car, and protruding toward an outside of a compartment of the car;
   a sealing member provided to the door flange, and covering up the door flange at least from the outside of the compartment; and
   a trim strip secured to the sealing member, and positioned outside the compartment with respect to the sealing member, wherein
   the sealing member (i) includes a trim strip securing groove opening toward the outside of the compartment and extending in a front-rear direction of the car so that a securing leg, formed on the trim strip, is inserted into the trim strip securing groove, and (ii) integrally includes a core for reinforcing the sealing member, the core being completely encapsulated within the sealing member,
   the core includes an engagement protruding portion integrally formed with the core and protruding upwards along a width of the trim strip securing groove from the core toward an inside of the trim strip securing groove, such that the engagement protruding portion projects into the trim strip securing groove, and
   when inserted into the trim strip securing groove, the securing leg of the trim strip engages with the sealing member.

2. The construction for securing the trim strip of claim 1, wherein:
   the securing leg of the trim strip includes a fitting portion located at a tip of the securing leg and configured to engage the engagement protruding portion.

3. The construction for securing the trim strip of claim 1, wherein: the core includes a plate portion extending along a side face, and in a depth direction, of the trim strip securing groove.

4. The construction for securing the trim strip of claim 1, wherein the engagement protruding portion, protruding toward the inside of the trim strip securing groove, is an upwardly bent portion of the core.

5. The construction for securing the trim strip of claim 4, wherein:
   the core includes a plate portion extending along a side face, and in a depth direction, of the trim strip securing groove, and
   the engagement protruding portion is formed in a middle, and in the depth direction, of the trim strip securing groove of the plate portion of the core.

6. The construction for securing the trim strip of claim 1, wherein:
   the door flange is formed to extend in the front-rear direction of the car, and to bend or bend round in a vertical direction of the car,
   the sealing member is an extrusion-molded portion made by extrusion molding,
   the core includes:
      a first plate portion positioned above the door flange and extending in the front-rear direction of the car; and
      a second plate portion positioned below the door flange and extending in the front-rear direction of the car,
   the first plate portion extends further toward the inside of the compartment than the second plate portion extends, and the engagement protruding portion is formed to protrude upwards from the first plate portion and to be positioned across the door flange from a tip of a window glass.

* * * * *